(12) United States Patent
Hasinski et al.

(10) Patent No.: US 10,618,650 B2
(45) Date of Patent: Apr. 14, 2020

(54) UNMANNED AERIAL VEHICLES

(71) Applicant: AIRBUS DEFENCE AND SPACE LIMITED, Stevenage (GB)

(72) Inventors: Julian Hasinski, Gwent (GB); Brian Turton, Gwent (GB)

(73) Assignee: Airbus Defence and Space Ltd., Stevenage (GB)

( * ) Notice: Subject to any disclaimer, the term of this patent is extended or adjusted under 35 U.S.C. 154(b) by 562 days.

(21) Appl. No.: 15/328,352

(22) PCT Filed: Jul. 22, 2015

(86) PCT No.: PCT/GB2015/052120
§ 371 (c)(1),
(2) Date: Jan. 23, 2017

(87) PCT Pub. No.: WO2016/012790
PCT Pub. Date: Jan. 28, 2016

(65) Prior Publication Data
US 2018/0194463 A1    Jul. 12, 2018

(30) Foreign Application Priority Data
Jul. 23, 2014    (GB) .................................. 1413093.4

(51) Int. Cl.
*B64C 39/02*    (2006.01)

(52) U.S. Cl.
CPC .......... *B64C 39/024* (2013.01); *B64C 39/028* (2013.01); *B64C 2201/027* (2013.01);
(Continued)

(58) Field of Classification Search
CPC .... B64G 1/58; B64G 1/14; B64C 1/40; B64C 1/12; B64C 3/26; B64C 39/024;
(Continued)

(56) References Cited

U.S. PATENT DOCUMENTS

| 1,608,461 A | 11/1926 | Cogswell |
| 6,474,603 B1 | 11/2002 | Kinkead et al. |

(Continued)

FOREIGN PATENT DOCUMENTS

| CN | 1082879692 A | 1/2013 |
| CN | 103 213 681 A | 7/2013 |

(Continued)

OTHER PUBLICATIONS

EnglishTranslationCN103213681.*
(Continued)

*Primary Examiner* — Assres H Woldemaryam
(74) *Attorney, Agent, or Firm* — Greer, Burns & Crain Ltd.

(57) ABSTRACT

Unmanned aerial vehicles (1), and methods of flying such, comprising at least four rotors (2) arranged such that the plane of rotation of each rotor (2) is co-planar with a face of a notional polyhedron, and wherein each face of the notional polyhedron is co-planar with the plane of rotation of at least one rotor (2). Such methods comprise: a first step of flying the vehicle (1) using a first rotor set (2*a-c*) to provide lift; and, a second step using a second rotor set (2*d-f*) to provide lift; wherein, the second rotor set (2*d-f*) includes at least one rotor (2) that is not used to provide lift in the first step or that operates so that airflow through the rotor (2) is in the opposite direction to that through the rotor (2) during the first step; and, wherein at least one of the first and second sets (2*a-c*, 2*d-f*) comprises a plurality of rotors (2).

18 Claims, 6 Drawing Sheets

(52) U.S. Cl.
CPC .. *B64C 2201/108* (2013.01); *B64C 2201/127* (2013.01); *B64C 2201/162* (2013.01)

(58) Field of Classification Search
CPC ............ B64C 39/028; B64C 2201/162; B64C 2201/127; B64C 2201/027; B64C 2201/108
See application file for complete search history.

(56) References Cited

U.S. PATENT DOCUMENTS

| | | | |
|---|---|---|---|
| 6,575,402 | B1 | 6/2003 | Scott |
| 7,249,732 | B2 | 7/2007 | Sanders, Jr. et al. |
| 9,573,683 | B2 * | 2/2017 | Martin .................. B64C 27/50 |
| 2005/0061910 | A1 | 3/2005 | Aloys |
| 2007/0023581 | A1 * | 2/2007 | La ......................... B64C 27/20 244/165 |
| 2011/0226892 | A1 | 9/2011 | William et al. |
| 2013/0206915 | A1 | 8/2013 | Desaulniers |
| 2014/0131507 | A1 | 5/2014 | Kalantari et al. |

FOREIGN PATENT DOCUMENTS

| | | | | |
|---|---|---|---|---|
| CN | 103213681 | * | 7/2013 | ............ B64C 39/00 |
| CN | 104044741 A | | 9/2014 | |
| EP | 1502852 A1 | | 2/2005 | |
| GB | 2462452 A | | 8/2008 | |
| WO | WO 95/07215 A1 | | 3/1995 | |
| WO | WO2008/140851 A2 | | 11/2008 | |
| WO | WO2009/072754 A2 | | 6/2009 | |
| WO | WO2013/123944 A1 | | 8/2013 | |
| WO | WO 2013/155639 A1 | | 10/2013 | |
| WO | WO-2013155639 A1 * | | 10/2013 | ............... B64B 1/32 |

OTHER PUBLICATIONS

ClaimsEnglishTranslationCN 103213681.*
Parrot AR Drone 2.0 URL: ardrone2.parrot.com (cited in UK search).
IROS 2013: Should Quadrotors All Look Like This? By Evan Ackerman, posted Nov. 13, 2013, 3 pages, http://spectrum.ieee.org/automaton/robotics/drones/iros-2013-should-quadrotors-all-look-like-this.
DIY Drones, posted by Chris Anderson on Nov. 13, 2013, 6 pages. http://diydrones.com/profiles/blogs/researchers-say-triquad-is-more-efficient-than-a-quad.

* cited by examiner

UNMANNED AERIAL VEHICLES

FIELD OF THE INVENTION

The present invention concerns improvements in and relating to unmanned aerial vehicles. More particularly, but not exclusively, this invention concerns an unmanned aerial vehicle comprising at least four rotors, each rotor having a plane of rotation, wherein the at least four rotors are arranged such that the plane of rotation of each rotor is co-planar with a face of a notional polyhedron, and wherein each face of the notional polyhedron is co-planar with the plane of rotation of at least one rotor.

The invention also concerns improved methods of flying unmanned aerial vehicles. More particularly, but not exclusively, this invention concerns a method of flying an unmanned aerial vehicle, the vehicle comprising at least four independently controllable rotors, wherein the method comprises: a first step of flying the vehicle using a first set of the rotors to provide lift; and a second step of flying the vehicle using a second set of the rotors to provide lift; wherein, the second set of rotors used in the second step includes at least one rotor that is not used to provide lift in the first step or that operates so that the airflow through the rotor is in the opposite direction to that of the airflow through the rotor during the first step; and wherein at least one of the first set and the second set comprises a plurality of rotors.

The invention also concerns a method of performing a search and rescue operation using an unmanned aerial vehicle, and a method of imaging an area using an unmanned aerial vehicle.

BACKGROUND OF THE INVENTION

Unmanned aerial vehicles (UAVs) provide a useful means to aerially explore locations that are unsuitable for manned aircraft, for example because the area is considered too unsafe to allow human access, or because the area is in a confined space that is too small to accommodate a manned aircraft. UAVs may for example be equipped with a sensor device, such as a camera, to feed information back to a remotely-located user. An advantage of UAVs, as compared to remotely controlled ground vehicles for example, is their ability to fly over and around obstacles.

A common use for UAVs is in search and rescue operations. In particular, UAVs are useful for determining whether or not it is safe to allow rescue personnel to enter an area, and indeed whether or not there are people or animals in an area that require assistance. Sites where search and rescue UAVs are used may be strewn with obstacles, and may often only be accessible through small openings. For example, it may be that a UAV is used to examine the inside of a collapsed building in order to determine the location of survivors and to find the safest access route for rescuers.

In order to be useful in such challenging environments it is desirable for UAVs to be highly manoeuvrable and have high stability in flight. UAVs in the form of helicopters are particularly useful in search and rescue applications because of their ability to hover. Often, UAVs are multi-rotor helicopters, comprising for example four or more rotors to improve flight stability. Helicopter UAVs comprising four rotors are sometimes referred to as 'quadcopters.'

A common quadcopter design has a co-planar arrangement of rotors, which arrangement provides good stability. Quadcopters having coplanar rotors are manoeuvred forwards, backwards or sideways (i.e. in the x or y direction) by altering the rotational speed of each rotor. A disadvantage of such a design is the difficulty of manoeuvring the UAV in the x or y direction without substantial vertical movement (i.e. in the z direction).

Another typical quadcopter design comprises a so-called 'v-tail' arrangement of rotors, in which two rotors are coplanar, whilst the remaining two are angled at 45 degrees to the co-planar rotors and at 90 degrees to each other (forming a 'v' shape). Such an arrangement improves manoeuvrability, but does not completely eliminate the difficulty of achieving horizontal-only movement.

Rotor-based UAVs sometime incorporate moveable wings or other moveable aerodynamic surfaces in order to improve manoeuvrability but incorporating such extra moveable surfaces increased the number of moving parts in the UAV and can add weight/complexity and/or reduce reliability as a result.

Conventionally, multi-rotor UAV helicopters are elongate in shape, extending further in the x and y directions than in the z direction, with rotors spaced apart horizontally. Often, rotors are mounted on booms connected to a central body. Such an arrangement leaves rotors vulnerable to damage if the UAV comes into contact with an obstacle whilst in flight. Although it is known to enclose rotors in a protective cowling, the power-to-weight ratio of the resulting UAV is diminished.

Typically, sensors such as cameras or other scanning equipment is mounted underneath UAV helicopters away from top-mounted rotors. A disadvantage of that arrangement is the inability of the UAV to scan its entire surrounding, including the space above it. When UAVs are used to explore and map an area, such as the inside of a damaged or partially collapsed building, it would be useful to map the entire volume of a space.

A further disadvantage of conventional, elongate multi-rotor UAV helicopter designs is their susceptibility to instability in unpredictable and turbulent airflow. In particular, both coplanar and v-tail quadcopters do not cope well when buffeted with air currents from different directions, and suffer from reduced stability when flying in close proximity to objects such as walls or beams that disturb local air flow. Furthermore, if a collision with an object unbalances known UAVs, it is typically very difficult for an operator to maintain flight. If, for example, a collision leads to a conventional UAV landing the wrong way up, take-off is unlikely to be possible, even if the crash did not result in severe damage.

A drawback of traditional, elongate multi-rotor UAV helicopters is that should one or more rotors be damaged or become inoperable during use, continued flight of the unbalanced UAV can be extremely difficult or impossible. Since UAVs are often deployed in areas not deemed safe for human access, it is unlikely that retrieval of the UAV will be possible, and so the equipment will be lost.

Therefore, there remains a need for highly manoeuvrable UAVs with stable flight and the ability to scan their surroundings in all directions with on-board sensors. There also remains a need for UAVs that are more robust and resilient to crash damage, and that can continue to fly in the event of damage during use.

The present invention seeks to mitigate the above-mentioned problems. Alternatively or additionally, the present invention seeks to provide an improved UAV. Alternatively or additionally, the present invention seeks to provide an improved method of flying a UAV for the purposes of acquiring information about the surrounding environment from sensors on the UAV.

SUMMARY OF THE INVENTION

The present invention provides, according to a first aspect, an unmanned aerial vehicle (referred to herein also as a "UAV") comprising at least four rotors, each rotor having a plane of rotation, wherein the at least four rotors are arranged such that the plane of rotation of each rotor is co-planar with a face of a notional polyhedron, and wherein each face of the notional polyhedron is co-planar with the plane of rotation of at least one rotor. Such a UAV may have particular application when the UAV is provided with one or more on-board sensors; as such the UAV may include one or more such sensors. There may be one or more rotors coplanar with each such face, but it is preferred for there to be one rotor per face of the notional polyhedron.

The arrangement of the rotors according to the first aspect of the invention enables embodiments in which the UAV is substantially directionally agnostic. For example, a UAV according to an embodiment of the first aspect of the invention can be flown (and preferably can also take off) in any orientation without substantial loss of lift or manoeuvrability. Furthermore, the arrangement of rotors of the UAV of such an embodiment allows the UAV to be rotated in 360 degrees in any direction. The ability of the UAV of such an embodiment of the invention to rotate fully in all directions can allow one or more on-board sensors to fully view and/or map their surroundings.

The plane of rotation of a rotor may be defined as the mid-plane of the circular disc-shape that is swept out by the rotor when rotated. The rotor will typically have two or more rotor blades.

Another potential advantage that a UAV according to an embodiment of the first aspect of the invention may possess is its ability to maintain stable flight even when subjected to air flow from various different directions. In particular, the arrangement of the rotors of such an embodiment the first aspect of the invention allows the UAV to maintain steady flight simply by appropriately adjusting the rotational speed of each of the at least four rotors, for example in response to changes in the direction of airflow or in response to detected changes in orientation.

Another potential advantage that a UAV according to an embodiment of the first aspect of the invention may possess is that the arrangement of rotors may allow the UAV to 'tumble' in flight. Such a tumbling motion may consist of rotation about an axis that itself moves in space. Such a tumbling motion may consist of rotation about a generally horizontal axis that itself rotates about a transverse axis and/or translates in space. A tumbling motion may allow on board sensors to rapidly scan the surroundings of the UAV. The tumbling motion may allow the UAV to follow a substantially unpredictable flight path and thus reduce the ability of unfriendly devices to track the UAV.

Yet another potential advantage that a UAV according to an embodiment of the first aspect of the invention may possess is the ability for the UAV to translate in any direction during flight.

Preferably, the UAV according to an embodiment of the first aspect of the invention does not comprise any wings.

The notional polyhedron may be a convex polyhedron. The notional polyhedron may include at least one face which is in the form of a regular polygon. All faces of the notional polyhedron may be regular polygons. The notional polyhedron may be a regular polyhedron. Regular polyhedrons have greater symmetry than irregular polyhedrons, thus increasing the directional agnosticity of the UAV. It may be that the tumbling motion of the UAV, and the ability of the UAV to fly in turbulent conditions, is improved when the notional polyhedron is a regular polyhedron. It is believed that the ability of the UAV of the first aspect of the invention to tumble controllably and to maintain stable flight in turbulent air conditions improves as the symmetry of the rotor arrangement increases. Providing six or more rotors may also improve stability and/or manoeuvrability.

It is preferred that the notional polyhedron has between 4 and 20 faces inclusive, and preferably 4, 6, 8, 12 or 20 faces. It is preferred for there to be more than four rotors. There may be five rotors (in which case it is preferred for there to be only five faces to the notional polyhedron). There may be more than five rotors. There may be six rotors (in which case it is preferred for there to be only six faces to the notional polyhedron).

Optionally, the notional polyhedron is a polyhedron selected from the list consisting of tetrahedron, pentahedron, hexahedron (preferably a cuboid and more preferably a cube), heptahedron, octahedron, nonahedron, decahedron, dodecahedron and icosahedron. The notional polyhedron may be in the form of one of the five Platonic solids.

Preferably, at least two of the faces of the notional polyhedron overlaps at least partially with the rotational plane of the at least one rotor coplanar with that face. Preferably, the edges of each face of the notional polyhedron surround the notional circular disc-shape that is swept out by the rotation of the or each rotor that is coplanar with that face. For example, a UAV according to an embodiment of the first aspect of the invention may have a cubic arrangement of six rotors: it may be that each rotor fits entirely within each of the six square faces of the notional cube. Alternative embodiments are however envisaged in which there are one or more rotors which are not surrounded by the edges of the coplanar face of the notional polyhedron. For example, it may be that the notional polyhedron is formed by extrapolating the plane of rotation of the four or more rotors.

Preferably, the notional polyhedron is a cube. When the polyhedron is a cube, the UAV comprises at least six rotors, wherein each face of the cube is coplanar with at least one rotor. Preferably, the notional polyhedron is a cube and the UAV comprises six rotors. The cubic arrangement of three pairs of parallel rotors provides a particularly useful combination of mechanical simplicity and high symmetry.

Preferably, the UAV of the first aspect of the invention comprises six rotors, the notional polyhedron is a cube, and the edges of each of the six faces of the notional cube surround the notional circular disc-shape that is swept out by the rotation of the rotor coplanar with that face, there preferably being one rotor per face. Such an arrangement is particularly useful because it allows each pair of parallel rotors (i.e. the rotors on opposite faces of the notional cube) to cooperate.

Preferably, the notional polyhedron is not elongate is shape. Optionally, the area of any one face of the notional polyhedron is not more than 150& (and more preferably 125%) of the area of any other face of the notional polyhedron. For example, it may be that all the faces of the notional polyhedron have substantially the same area. Having faces of similar area increases the symmetry of the notional polyhedron.

Optionally, the diameter of the notional circular disc-shape that is swept out by the rotation of each rotor ("the diameter of the rotor") is not less than 25% of the longest dimension of the face of the notional polyhedron coplanar with the rotor. Preferably, the rotor and any surrounding mountings and/or drive mechanism substantially fills the coplanar face of the notional polyhedron. For example, it may be that the diameter of the rotor is substantially equal to the largest diameter that can be accommodated on the coplanar face of the notional polyhedron. Having the largest possible rotor on each face of the notional polyhedron may increase manoeuvrability.

Preferably, the centre point of each face of the notional polyhedron is aligned with the axis of rotation of a rotor coplanar with that face. Such an arrangement increases the symmetry of the rotor arrangement of the UAV. It is preferred that a single rotor only be associated with each respective face of the national polyhedral, so that the UAV has n rotors which collectively define an n-faced polyhedron.

Optionally, each of one or more of the faces of the notional polyhedron is coplanar with the planes of rotation of a plurality of rotors. Having a plurality of rotors coplanar with each of one or more faces of the notional polyhedron may increase manoeuvrability. For example, it may be that each face of the notional polyhedron is coplanar with the planes of rotation of two, three, or four rotors. It may be that at least two of the faces of the notional polyhedron are coplanar with the rotational planes of different numbers of rotors. For example, it may be that the notional polyhedron is a cuboid that is rectangular in cross-section, and that the four rectangular faces of the cuboid are coplanar with the rotational planes of more rotors than the square faces of the cuboid. It may be that the notional polyhedron is a prism having identical base faces joined by rectangular/square side faces such that each of the base faces of the prism are coplanar with the rotational planes of more rotors than each of the side faces of the cuboid. When one or more faces of the notional polyhedron are coplanar with the planes of rotation of a plurality of rotors, the rotors associated with a given face of the notional polyhedron may all be surrounded by the edges of that face.

It is preferred that each of the at least four rotors have similar properties, preferably being substantially the same. Thus, there may be no single rotor deemed as the primary rotor with other being provided for secondary purposes. The at least four rotors may all be of the substantially the same size. Having the at least four rotors being of substantially the same size, facilitates the design of a direction-agnostic and symmetrically configured UAV.

The UAV may have a main body. The main body may be generally the same shape and size as the notional polyhedron. Each of the rotors of the UAV may be arranged at the periphery of the main body. The main body may be so shaped as to define a space within the centre of the body which facilitates the flow of air to or from each of the rotors. The main body may thus be substantially hollow. For example, it may be that at least 50%, optionally 75%, and possibly as much as 80% of the volume enclosed by the notional polyhedron is filled with air. Providing such empty space within the centre of the body of the UAV assists with providing sufficient airflow across the rotors of the UAV. The main body may comprise a frame structure. Each rotor may be mounted in the main body of the UAV such that, in the plane of the rotor, the main body completely surrounds the rotor.

The UAV of the first aspect of the invention may thus comprise an internal void. The internal void may be approximately the same shape as the notional polyhedron. The internal void may be entirely air-filled.

Optionally, the UAV of the first aspect of the invention comprises a substantially hollow frame, wherein the frame supports the at least four rotors. Preferably, the frame is substantially the same shape as the notional polyhedron. For example, it may be that the frame is substantially the same shape as the notional polyhedron and each face of the shape of the frame is substantially parallel to a face of the notional polyhedron. Additionally or alternatively, it may be that the frame comprises a plurality of edges, wherein each edge of the frame is substantially parallel to an edge of the notional polyhedron. The UAV body may be in the form of an exoskeleton structure, such as a frame. It is believed that the use of an exoskeleton framework may assist in allowing sufficient airflow across the rotors. Such an exoskeleton structure may provide the supporting structure of the UAV. Such an exoskeleton structure may surround and protect each of the rotors in the rotational plane of the rotor.

The UAV may comprise a shell, for example a shell having at least four openings for the rotors. It may be that the shell is mounted on a framework. The shell may define an exoskeleton structure. Alternatively, it may be that the shell provides the supporting structure of the UAV, in which case there may be no need for a framework. Optionally, the shell is substantially the same shape as the notional polyhedron. For example, it may be that the notional polyhedron is a cube and the shell is in the shape of a cube having chamfered corners, or that the notional polyhedron is a tetrahedron and the shell is in the shape of a tetrahedron having chamfered corners. Alternatively, the shell may be a different shape to the polyhedron. For example, it may be that the notional polyhedron is a cube and the shell is in the shape of a sphere; or it may be that the notional polyhedron is in the shape of a cube and the shell is in the shape of an octahedron.

The shape of the body, whether in the form of a frame, shell or otherwise, of the UAV may correspond to the shape of the polyhedron but having chamfered corners. Such a shape may have improved aerodynamics. It may also be that the chamfered corners provide convenient locations to mount sensors, for example inset sensors.

Preferably, the tips of the rotors are surrounded or enclosed by the frame and/or the shell. For example, it may be that each rotor is recessed into a face of the shape of the frame and/or the shell. Such an arrangement allows for the provision of a robust UAV in which the rotors are protected from damage during flight and during storage.

Preferably, each of the at least four rotors is separately controllable, for example each of the at least four rotors is driven by a separate motor.

Preferably, each rotor is operable in both forward and reverse directions.

Optionally, each rotor is driven by a motor connected to the rotor by an axial shaft. Alternatively, each rotor is driven by a motor connected to the rotor by a circumferential drive. When each rotor is driven by a circumferential drive, the motors can be mounted on the edges or faces of the notional polyhedron, and thus minimise the obstruction of airflow across each rotor.

Preferably, each rotor is driven by a brushless motor. Preferably, the brushless motor is capable of reversing direction rapidly, for example it may be that the brushless motor is capable of reversing direction in 100 milliseconds or less. It may be that each motor is controlled by an independent metal-oxide-semiconductor field-effect transistor (MOSFET) based controller.

The axes of rotation of the rotors may be fixed relative to each other. Having fixed axes rotors may help simplify construction and/or may increase reliability of operation. The rotors will typically be so positioned so that the axes of rotation of the rotors converge towards the centre of the UAV, but it need not be the case that the axes coincide at one point. Typically, the axes of the rotors are such that at least three of them are non-parallel and non-coplanar. Typically, the UAV is configured such that the rotors are arranged around its periphery.

Preferably, all batteries, motor controllers, motors and any electronics are located substantially at or around the faces and/or edges of the notional polyhedron. Such an arrangement may assist in providing a substantially hollow-bodied UAV.

The UAV is preferably small and compact. It is preferred that the maximum dimension of the main body of the UAV is less than 1 m and preferably less than 500 mm. The UAV may have a mass of less than 7 Kg. The volume of the notional polyhedron is preferably less than 200,000 cm$^3$, more preferably less than 100,000 cm$^3$ and may be less than 30,000 cm$^3$.

As mentioned above, the UAV of the first aspect of the invention may comprise at least one sensor, preferably a plurality of sensors. Advantageously, the at least one sensor is located substantially at or around the faces and/or edges of the notional polyhedron. Such sensors are thus typically mounted at the periphery of UAV.

For example, it may be that the at least one sensor is located substantially at, or near to, a vertex of the notional polyhedron. It has been found that such arrangements of the at least one sensor helps to maintain the hollow-bodied structure of the UAV.

Preferably, the UAV of the first aspect of the invention comprises at least four sensors, wherein each sensor is located approximately at a vertex of the notional polyhedron. For example, it may be that each sensor is located along an axis extending through the centre point of the notional polyhedron and through a vertex of the polyhedron. Preferably, the at least four sensors are positioned in the approximate locations of at least four vertices.

Preferably, when the UAV of the first aspect of the invention comprises a supporting framework and/or a shell, at least one sensor is mounted on the framework or shell.

Preferably, a plurality of sensors is arranged such that the combined field of vision of the plurality of sensors extends in all directions from the UAV. Advantageously, the field of vision of each sensor overlaps with the field of vision of at least one other sensor, preferably a plurality of other sensors. For example, it may be that there are several sensors, say four or more, having an effective hemispherical field of vision, located such that the fields of view of three sensors overlap.

Preferably, when the notional polyhedron has x vertices, the UAV of the first aspect of the invention comprises at least x sensors. Optionally, the UAV of the first aspect of the invention comprises a plurality of sensors, wherein at least one sensor is positioned at or near every vertex of the notional polyhedron.

There may be at least four sensors all mounted in different locations, the four locations not being co-planar. There may be five or more sensors being so arranged that no group of four sensors are co-planar. (It will be appreciated that there may be extra sensors not counted in the group of five or more sensors which are coplanar with three of the five or more sensors sensors.)

Optionally, when the notional polyhedron is a cube and the UAV comprises a frame or shell in the shape of a cube with chamfered corners, at least one sensor is located at each of the chamfered corners of the frame or shell. Optionally, when the notional polyhedron is a tetrahedron and the UAV comprises a frame or shell in the shape of a tetrahedron with chamfered corners, at least one sensor is located at each of the chamfered corners of the frame or shell. Optionally, when the notional polyhedron is a dodecahedron and the UAV comprises a frame or shell in the shape of a dodecahedron with chamfered corners, at least one sensor is located at each of the chamfered corners of the frame or shell. It has been found that locating at least one sensor at each of the chamfered corners of a cube, a tetrahedron, or a dodecahedron provides an arrangement of sensors having a combined field of vision extending in all directions and a well-balanced UAV with high symmetry. More generally, when the shape of the body, frame or shell of the UAV corresponds to the shape of the notional polyhedron but with chamfered corners, it is preferred that the sensors are provided in the spaces defined by the chamfered corners.

It may be that the sensors are located in the space available between adjacent rotors. There may be three rotors mounted adjacent to each other with planes of rotors meeting at a vertex and sensor is mounted at or in the region of said vertex. It will be understood that the UAV structure may not encompass said vertex. It is preferred that the separation of the sensor from the adjacent rotor is about the same for each of the adjacent rotors.

Preferably, the at least one sensor is an imaging sensor. Optionally, the at least one sensor comprises an optical sensor device. Optionally, the at least one sensor comprises a sensor device operating outside the visible light spectrum. Optionally, the at least one sensor comprises an ultrasound device. Optionally, the at least one sensor comprises a laser range-finder. Different sensors may be arranged around the UAV, so that certain sensors are provided on certain sides/edges/vertices/locations only. The arrangement of sensors of a given type may be symmetrically arranged on the UAV. There may be sensors mounted at opposite locations on the UAV.

Preferably, the at least one sensor is a camera, for example a camera sensitive to visible light and/or a thermal imaging camera. Images fed back from a UAV comprising a plurality of camera sensors having a combined field of vision extending in all directions can be laced or stitched together using appropriate software and data processing to provide a full spherical field of view. Such a complete field of view is particularly useful in search and rescue operations where the entire surroundings of the UAV need to be assessed by the operator.

Preferably, the plurality of camera sensors are arranged to provide a spherical field of view. When combined with image registration software, for example, camera sensors arranged to provide a spherical field of view can be used to provide a continuous view in one direction as the UAV rotates or spins in space. For example, if images from each sensor are recorded sequentially as the UAV rotates, it may be that the spherical field of view is used by the image registration software to provide a stable view to an operator.

Preferably, the at least one sensor is a transmit/receive unit, for example a transmit/receive unit of the kind found in phased array radar systems and/or synthetic aperture radar systems. Typically, in a conventional aircraft, motion of the aircraft is required to utilise phased array radar systems and/or synthetic aperture radar systems. It may be that rotation and/or tumbling of the UAV allows operation of on-board phased array radar systems and/or synthetic aperture radar systems whilst the UAV remains in a substantially fixed position in space, for example while hovering.

Preferably, the notional polyhedron is a cube, the UAV comprises a frame or shell in the shape of a cube with chamfered corners and six rotors (each located in the centre of a face of the cube and recessed into the 8-sided faces of the frame or shell), and a camera is located on each of the chamfered corners of the frame or shell. It is believed that such an arrangement of rotors, frame or shell, and camera sensors provides a highly manoeuvrable, versatile and robust UAV. In particular, it is believed that that arrangement provides an optimal balance of factors including: protecting each rotor from collision damage, ensuring that no vertex is placed in the direct path of the flow of air from a rotor, minimising the number of images required to be stitched together to form a complete picture of the UAV's surroundings, and minimising mechanical complexity.

Optionally, the UAV of the first aspect of the invention comprises two or more different types of sensor. For example, it may be that two or more types of sensor are located at each sensor location on the UAV.

Preferably, the UAV of the first aspect of the invention comprises a communication system. For example, it may be that the UAV comprises a communication system for receiving commands from an operator and/or for transmitting data from the on-board sensors back to the operator in real time. Alternatively or additionally, the UAV is preferably programmable to operate without live input from an operator and to retain sensor data for retrieval at a later time.

Optionally, the UAV of the first aspect of the invention comprises a communication system for communication with at least one other UAV. For example, it may be that the UAV comprises a communication system for relaying communications to a second UAV from an operator or from a third UAV.

Preferably, the UAV of the first aspect of the invention comprises at least one accelerometer and/or a GPS device. The UAV may include a sensor, such as a gyroscopic-based sensor for example, that is able to detect the absolute orientation and/or movement of the UAV.

Optionally, the UAV of the first aspect of the invention comprises at least one corner cube reflector and at least one laser distance finder. It has been found that the incorporation of at least one corner cube reflector and at least one laser distance finder enables pairs of UAVs to easily determine the distance between them.

Preferably, the UAV of the first aspect of the invention comprises a computational system, for example for processing operational commands, data from the on-board sensors and/or communications from the operator and/or other UAVs.

According to a second aspect of the invention there is also provided an unmanned aerial vehicle ("UAV") comprising at least four rotors arranged such that in any orientation of the vehicle there will be at least one rotor positioned such that its axis of rotation is oriented less than 60 degrees angle to the vertical (hereinafter "the maximum offset angle"), and such that the vehicle is arranged to be able to fly in any orientation of the vehicle.

Expressed alternatively, the rotors are arranged such that when the UAV is in an arbitrary but static position there will for any given direction be at least one rotor being oriented such that the angle defined between its axis and the line extending from a point on that axis in the given direction is less than the maximum offset angle.

It is preferred that the maximum offset angle is 55 degrees or less. More preferably, the maximum offset angle is 45 degrees or less. The lower the maximum offset angle the greater the number of rotors may be required, particularly in the case where the axes of rotation of the rotors are fixed relative to each other.

The UAV of the second aspect may thus be so arranged that it is able to fly in any orientation of the UAV.

According to a third aspect of the invention there is also provided a UAV comprising at least four rotors and a main body, wherein each of the rotors is arranged at the periphery of the main body, and the main body is so shaped as to define a space within the centre of the body which facilitates the flow of air to or from each of the rotors.

According to a fourth aspect of the invention there is also provided a method of flying a UAV. Thus there is provided, a method of flying an unmanned aerial vehicle, the vehicle comprising at least four independently controllable rotors, wherein the method comprises a first step of flying the vehicle using a first set of the rotors to provide lift, and a second step of flying the vehicle using a second set of the rotors to provide lift, wherein the second set of rotors used in the second step includes at least one rotor that is not used to provide lift in the first step or that operates so that the airflow through the rotor is in the opposite direction to that of the airflow through the rotor during the first step, and wherein at least one of the first set and the second set comprises a plurality of rotors.

Optionally, the second set of rotors used in the second step includes at least one rotor that is not used to provide lift in the first step. Additionally or alternatively, the second set of rotors used in the second step includes at least one rotor that operates so that the airflow through the rotor is in the opposite direction to that of the airflow through the rotor during the first step.

Thus the UAV may use different combinations of rotors or drive rotors in different directions to allow the UAV to fly in different orientations. The UAV may be such that it can fly any way up.

It may be that both the first set comprises a plurality of rotors and the second set comprises a plurality of rotors. It may be that both or at least one of the first set and the second set comprises three or more rotors.

The method may include a third step of flying the vehicle using a third set of the rotors to provide lift. The third set of rotors used in the third step may include at least one rotor that is not used to provide lift in the first step. Additionally or alternatively, the third set of rotors used in the third step may include at least one rotor that is used in the first step but which is operated to generate airflow through the rotor in the opposite direction to that of the airflow through the rotor during the first step.

According to a fifth aspect of the invention there is also provided a method of flying an unmanned aerial vehicle in order to capture data from an environment, the UAV comprising a plurality of sensors mounted at different locations on the vehicle to capture such data, wherein the method comprises a step of flying the vehicle so that it assumes a first orientation in space at which first data is captured by the sensors, rotating the vehicle by at least +90 degrees about a substantially horizontal axis so as to assume a second different orientation in space at which second data is captured by the sensors.

The UAV may manoeuvre to assume a third orientation in space at which third data is captured by the sensors. It may be that the movement of the UAV from the second orientation to the third orientation includes further rotation of the vehicle by at least +90 degrees about the same substantially horizontal axis.

The movement required to move the vehicle from the first orientation to the second orientation may include a component of rotation about a first fixed axis (not necessarily being exactly horizontal) in space by at least 90 degrees. The movement required to move the vehicle from the second orientation to the third orientation may include a component of rotation about a second fixed axis in space by at least 90 degrees. The movement required to move the vehicle from the second orientation to the third orientation may include a component of rotation about a third fixed axis in space by at least 90 degrees. The first, second and third fixed axes may be orthogonal to each other.

The method may include causing the UAV to rotate through successive revolutions, preferably about an axis that coincides with the body of the UAV (or at least passes through the smallest notional 3-dimensional convex shape that envelopes the UAV). There will in such a case be a component of rotation about at least one of the first, second and third fixed axes of more than 360 degrees. It is preferred that each of the successive revolutions of the UAV includes a component of rotation about a horizontal axis. It may be that whilst performing such successive revolutions of the UAV there is a component of translational movement. The direction of the translational movement may be generally transverse to the general direction of orientation of the axis about which the UAV revolves. The direction of the translational movement may be generally horizontal. The motion of the UAV may be a tumbling motion. The tumbling may be random or quasi-random. The tumbling may include rotation about an axis that itself rotates and translates relative to the local environment in which the UAV moves.

The flight of the UAV may be controlled by a control system. The UAV may have the ability to hover.

It may be that a plurality of UAVs of a type being in accordance with any of the aspects of the invention described or claimed herein are flown together as a group, possibly in formation. For example, it may be that a UAV of the invention is flown in tandem with a second UAV of the invention. For example, it may be that a first UAV embodiment according to the first, second or third aspect of the invention is flown together with a second UAV embodiment according to the first, second or third aspect of the invention. Preferably, the first UAV comprises a sensor that is used in cooperation with a sensor on the second UAV. For example, it may be that at least a first sensor on a first UAV is used in combination with at least a second sensor on a second UAV in order to provide a stereoscopic arrangement of sensors.

According to a sixth aspect of the invention there is also provided a method of performing a search and rescue operation using an unmanned aerial vehicle, wherein the unmanned aerial vehicle is a vehicle as described or claimed herein, and/or wherein the unmanned aerial vehicle is flown according to a method as described or claimed herein. It may be that the search and rescue operation is an operation performed by emergency services personnel to provide assistance to persons in distress, for example by conducting a search of a dangerous area such as a collapsed building.

According to a seventh aspect of the invention there is also provided a method of imaging an area using an unmanned aerial vehicle, wherein the unmanned aerial vehicle is a vehicle as described or claimed herein, and/or wherein the unmanned aerial vehicle is flown according to a method as described or claimed herein. Preferably, the method is a method of generating a 3D image of an area. It may be that the method is a method of mapping an area, for example a method of mapping the position of objects in an area.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
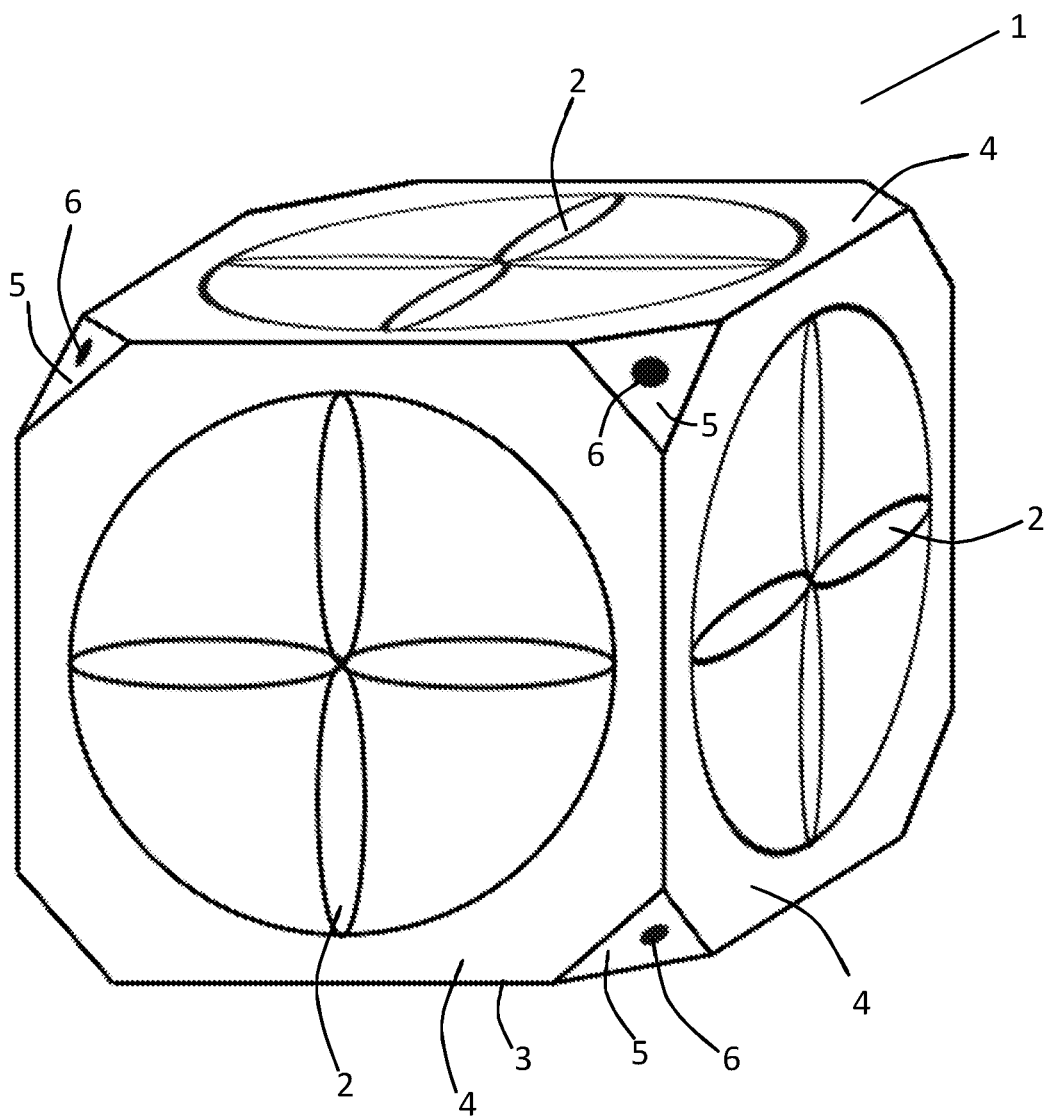
FIG. 1 is a front perspective view of a UAV according to a first embodiment of the invention.

A first example embodiment of the invention concerns a UAV having a cubic arrangement of rotors. As shown in FIG. 1, the UAV 1 of first embodiment comprises six rotors 2 (three of which are visible in FIG. 1, the other three being located on faces of the cube that are omitted for clarity). Each rotor has four blades. The rotational plane of each of the six rotors 2 is coplanar with one side of a notional cube, that in this embodiment is of approximately the same size and shape as the UAV structure, which is itself generally cube-shaped.

It will be seen that the UAV 1 of the first embodiment comprises a frame 3 having the shape of a cube with chamfered corners. The frame 3 thus has six eight-sided faces 4 (three of which are hidden from view in FIG. 1) and eight smaller three-sided faces 5 (five of which are hidden from view in FIG. 1) at the corners of the notional cube.

For the plane of each of the eight-sided faces 4 of the frame 3 of the UAV 1 there is a respective rotor 2 such that the plane of the face is parallel with the plane of rotation of the rotor. Each rotor 2 is recessed into the surface of the frame, thereby protecting the rotor.

The rotors 2 are in the form of helicopter style rotors. The rotors 2 are each powered by an independent motor (a brushless motor, not shown) controlled using a MOSFET based controller (not shown). The rotors are connected to and driven by the motors using a circumferential drive mechanism (not shown). The drive mechanism may be arranged to drive the rotor via one location at the circumference, the motor being located in the region around the vertex of the cube. Idler gears may be provided at other locations around the circumference of the rotor to provide a means for mounting the rotor relative to the UAV. Alternatively, other bearing arrangements may be provided. The rotors are each configured to be driven in either direction and can thus provide suction or pressure, reversal of the direction of the brushless motors being able to be effected in a matter of milli-seconds, thus enabling the provision of rapid thrust reversal.

The UAV 1 is equipped with eight camera sensors 6 (three of which are visible in FIG. 1), each one mounted on a three-sided face 5 of the frame 3. In other words, a camera is mounted on each chamfered corner of the cube-shaped UAV 1. Such an arrangement provides overlapping fields of view, thus providing the means to give a full spherical field of view by combining the imagery (which can readily be achieved in software, preferably at a location remote from the UAV in the case where image data gathered by the sensors in use can be wirelessly communicated from the UAV to a remotely located control system). The image, when the images from the camera at each vertex are combined into a whole, may be considered as an omni-directional image. Having the cameras mounted on such chamfered vertices reduces the number of cameras may might otherwise be required in the region of each vertex of the notional cube which helps reduced complexity, weight and cost of the UAV. A reduced number of cameras may in turn reduce the number of images that need to be fused/stitched together to form the omni-directional image. The sensors 6 are recessed in the frame 3 of the UAV to avoid direct damage in the case of a collision.

In use, the flight of, and manoeuvres performed by, the UAV are controlled by means of an on-board flight control system (which may itself receive instructions from a remotely located operator/central control system) of a type based on conventional systems readily available in the public domain. The on-board flight control system (not shown) provides the functions of ensuring stability and control of the vehicle and automatic guidance of the vehicle. The UAV also contains a computational system (not shown), that may incorporate the flight control system, and which incorporates the additional functions of communication with such a remotely located operator, and collection and integration of sensor data. The UAV also contains a communications antenna (not shown).

The general cube shape of the UAV of the first embodiment, and the provision of an external cubic structure with a hollow interior which defines a void, has several potential benefits. The cube shape provides structural integrity and allows batteries, electronics and drive motors to be housed outboard, which can improve airflow through the cube.

The structure (the frame 3 of the cube) provided that surrounds the rotors 2 can additionally protect the rotor tips from collision.

It will be seen that the axes of the rotors, being arranged in the three orthogonal directions, are arranged so that there will always be one that is less than 55 degrees (actually 54.74 degrees) from the vertical in whatever orientation the UAV is placed. The number and arrangement of the rotors is such that the cube can hover, translate in space and also tumble whilst manoeuvring. This tumbling motion may have uses in methods where the sensors on the UAV rely on movement of the vehicle to gather data. The on-board flight control system is programmed to adjust the rotor speed and direction of each of the six rotors to maintain either directional flight or hover, when performing a tumbling motion.

Furthermore from an aerodynamic perspective, the cube-shaped structure of the UAV, being an example case of a polyhedron with a rotor in each face, has by its nature (symmetry) the advantage of being able to respond to external airflows whatever the direction of that flow.

It is believed that for the cube-shaped UAV of the first embodiment, a suitable flight posture will be with three rotors facing down at 45 degrees to the horizontal. The UAV may fly such that the lower facing three rotors provide the main lift and stability for the UAV. The upper facing rotors may be operated to assist the flow of air through the cube for the benefit of the lower facing rotors. If during flight, none of the faces of the cube are either horizontal or vertical, rotor protection may be further enhanced.

The feature of the UAV having chamfered vertices may improve aerodynamics.

The UAV has a diameter of about 25 cm which equates to a volume of the order of 15,000 $cm^3$ (i.e. the volume enclosed the 3-D envelope of the UAV). The maximum dimension of the UAV is that provided by the distance from one chamfered corner to the diagonally opposite corner, which in this case is less than 40 cm. The symmetrical shape of the cube-shaped body of the UAV thus provides a relatively compact UAV, which in any orientation will have a relatively small width, height and depth (e.g. 0.5 m or less).

Thus, the UAV according to the first embodiment provides a robust unmanned aerial system (UAS) sensor and communications platform that can be optimised for cluttered environments. Foreign objects such as surrounding structures, obstacles or the like, can cause difficulties for conventional UAVs particularly in cluttered environments. Such clutter and structures are inevitable in urban environments where emergency services may need to operate. With a UAV of the first embodiment, the risk of damage to rotors from such foreign objects is reduced by means of the protection afforded by the frame that surrounds all of the rotors. The frame also performs the function of providing the overall structure of the UAV—leading to a low-weight solution. (Thus, it will be understood that the basic structural frame of the UAV also becomes the mechanism for protectively enclosing the rotors.) Instability during flight caused by the variations in air flow around the UAV due to clutter and adjacent structures can be reduced by means of the multiple rotors mounted on the various faces of the UAV. The compact size and shape of the UAV enables it to adopt a small width—in multiple orientations—and can thus operate through relatively small gaps, such as doorways, open windows and through corridors in a building.

The relative orientation of the UAV may be tracked in time so that the movement of the UAV can be compensated for using mechanisms such as image registration, GPS, accelerometers or gyroscopes thus allowing steady imagery despite perturbations, since all directions are covered. The UAV may also carry such other sensors (e.g. Ultrasound, laser-range finders, thermal cameras) and communications devices as may be useful to survey an area and source or relay back information.

A pair of UAV devices according to the first embodiment may be used in tandem, thus making stereoscopic views feasible and with suitable manoeuvring allowing in-situ true stereoscopic zoom (for example by moving the two UAVs apart in a direction perpendicular to the direction of viewing whilst optically zooming in on the region of interest in the scene being viewed). Multiple such UAVs may be used together, which may for example improve communication in a local area, if one or more UAVs can act as comms relay unit, optionally in addition to performing other functions.

Figure 2:
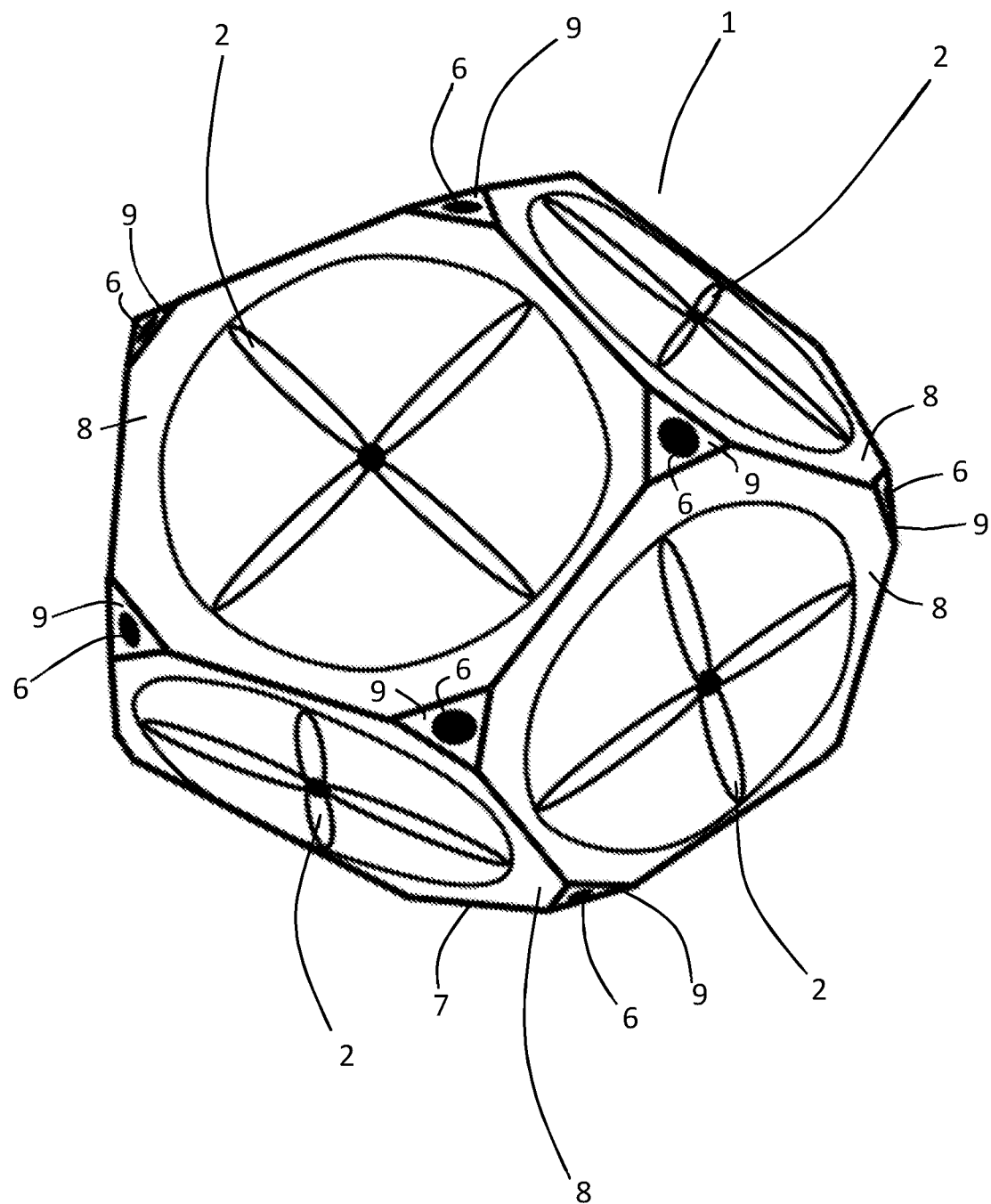
FIG. 2 is a front perspective view of a UAV according to a second embodiment of the invention.

A second example embodiment of the invention relates to a UAV 1 having a regular dodecahedral arrangement of rotors (FIG. 2). The UAV 1 comprises twelve rotors 2 (four of which are visible in FIG. 2, the other eight being located on faces of the dodecahedron that are omitted for clarity). The rotational plane of each of the twelve rotors 2 is each coplanar with a respective side of a dodecahedron (and thus the rotational planes of the twelve rotors define a notional polyhedron).

The body of the UAV 1 of the second embodiment is defined by a shell 7 having the shape of a dodecahedron with chamfered corners. The shell 7 has twelve ten-sided faces 8

(eight of which are hidden from view in FIG. 2) and twenty smaller three-sided faces 9 (thirteen of which are hidden from view in FIG. 2)—at the chamfered corners.

The plane of each of the ten-sided faces 8 of the shell 7 of the UAV 1 is parallel with the plane of rotation of one of the rotors 2. Each rotor 2 is recessed into the surface of the shell, thereby protecting the rotor.

The rotors 2 are each powered by an independent motor controlled using a MOSFET based controller (not shown). The rotors are connected to and driven by the motors using a circumferential drive mechanism (not shown).

The UAV 1 is equipped with twenty camera sensors 6 (seven of which are visible in FIG. 2), each one mounted on a three-sided face 9 of the shell 7. In other words, a camera is mounted on each chamfered corner of the cube-shaped UAV 1.

Figure 3:
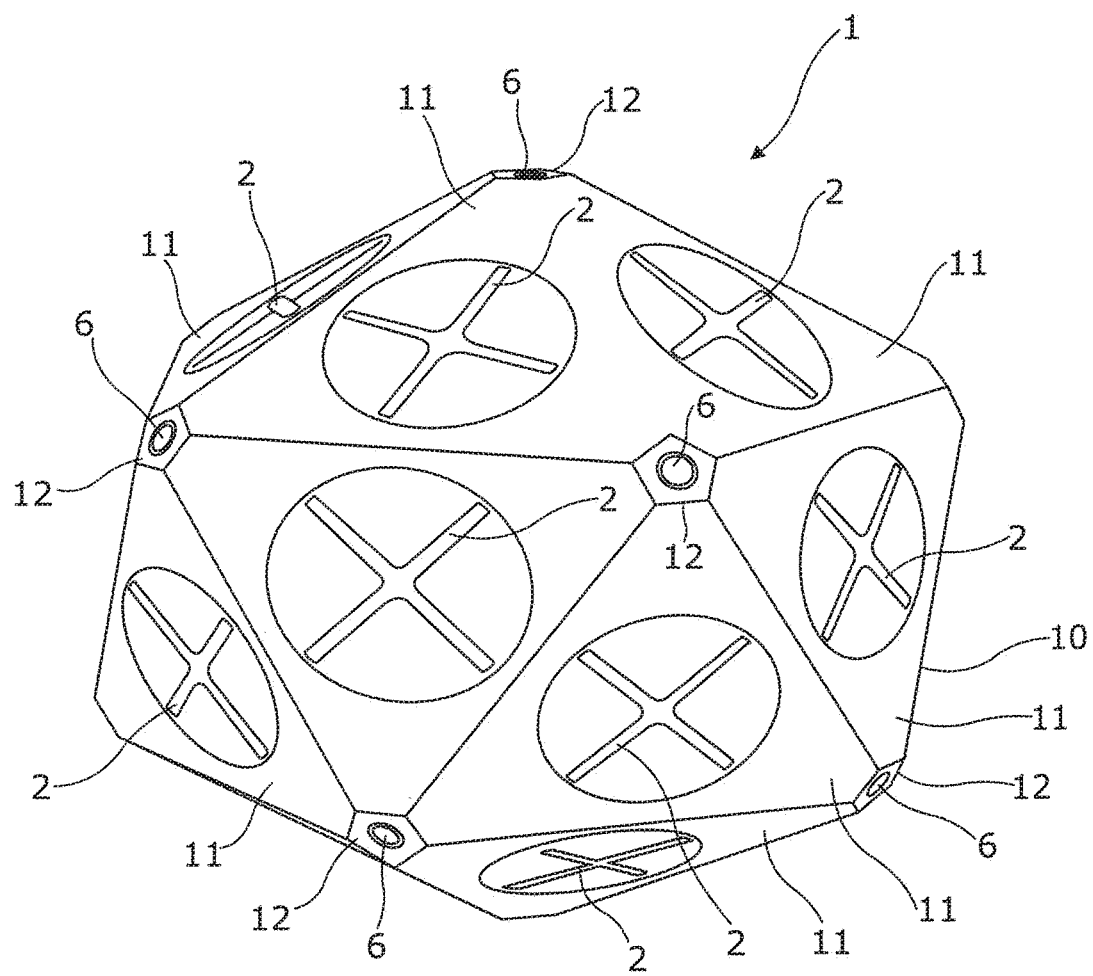
FIG. 3 is a front perspective view of a UAV according to a third embodiment of the invention.

FIG. 3 shows a third example embodiment of the invention, relating to a UAV 1 having an icosahedral arrangement of rotors. The UAV 1 comprises twenty rotors (eight of which are visible in FIG. 3, the other twelve being located on faces of the icosahedron that are omitted for clarity). The rotational plane of each of the twenty rotors 2 is coplanar with one side of an icosahedron (i.e. a notional polyhedron).

The UAV 1 of the third embodiment also comprises a shell 10 having the shape of an icosahedron with chamfered corners. The shell 10 has twenty six-sided faces 11 (twelve of which are hidden from view in FIG. 3) and twelve five-sided faces 12 (seven of which are hidden from view in FIG. 3).

The plane of each of the six-sided faces 11 of the shell 10 of the UAV 1 is parallel with the plane of rotation of one of the rotors 2. Each rotor 2 is recessed into the surface of the shell, thereby protecting the rotor.

The rotors 2 are each powered by an independent motor controlled using a MOSFET based controller (not shown). The rotors are connected to and driven by the motors using a circumferential drive mechanism (not shown).

The UAV 1 is equipped with twelve camera sensors 6 (five of which are visible in FIG. 3), each one mounted on a five-sided face 12 of the shell 10. In other words, a camera is mounted on each chamfered corner of the icosahedron-shaped UAV 1.

Figure 4:
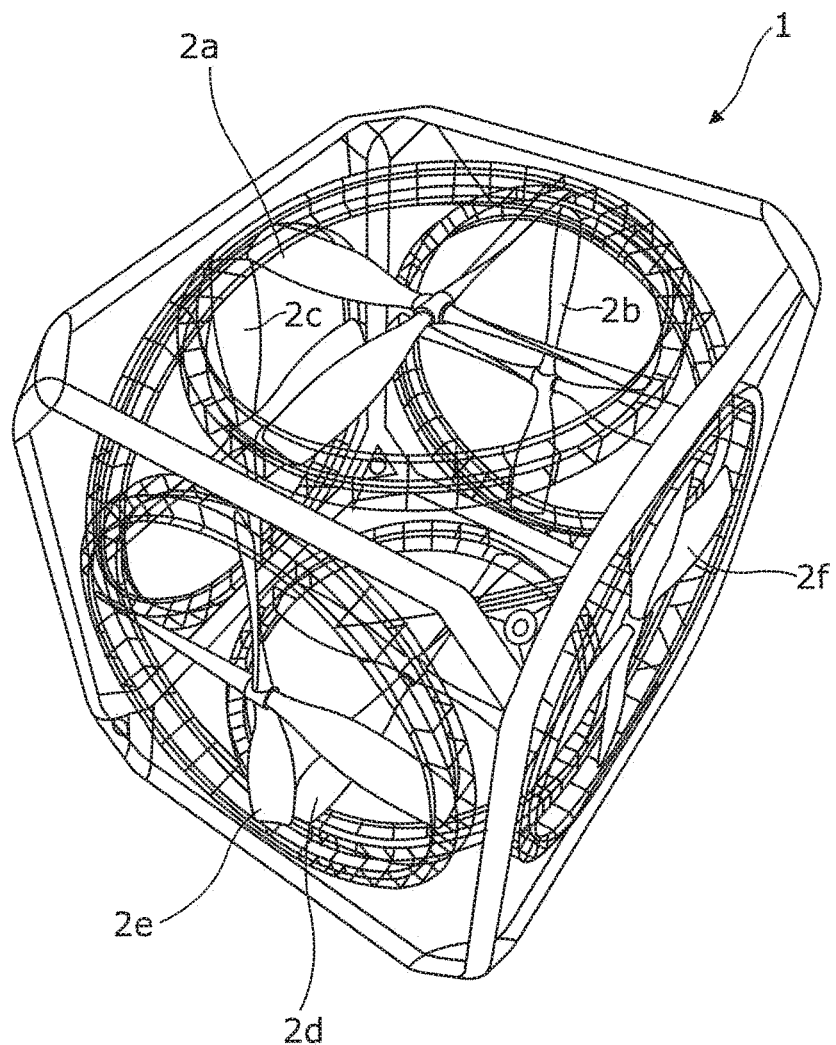
FIG. 4 is a front perspective view of a UAV operated according to a method of a fourth embodiment of the invention.

A fourth example embodiment relates to a method of flying a UAV 1, in which the UAV 1 comprises six independently controllable rotors (2a, 2b, 2c, 2d, 2e and 2f) (FIG. 4). The first set of rotors comprises three of the six rotors (2a, 2b and 2c), and the second set of rotors comprises the remaining three of the six rotors (2d, 2e and 2f).

The method according to the fourth example embodiment of the invention comprises a first step of flying the UAV 1 using the first set of three rotors (2a, 2b and 2c) to provide lift. Each of the rotors of the first set of rotors (2a, 2b and 2c) is separately driven by a brushless motor controlled by a MOSFET based controller (not shown).

The method of the fourth example embodiment of the invention also comprises a second step, in which the UAV is flown using the second set of three rotors (2d, 2e and 2f) to provide lift. Each of the rotors of the second set of rotors (2d, 2e and 2f) is separately driven by a brushless motor controlled by a MOSFET based controller (not shown).

The UAV may rotate in space so that different rotors are positioned uppermost/lowermost. Different rotors may be driven at different speeds (or, optionally, not driven at all) depending on the orientation of the UAV and the desired motion. Some only of the rotors may generate lift at certain instants with other, different, rotors generating lift at other instants (or, at least, the rotors primarily responsible for generating lift may vary with time, and/or in dependence on the orientation of the UAV). Thus, there may be a third step in the fourth embodiment of flying the vehicle using a third set of the rotors to provide lift such that the rotors used include at least one rotor that is not used to provide lift in the first step or that operates so that the airflow through the rotor is in the opposite direction to that of the airflow through the rotor during the first step. There may be successive steps in which a rotor newly becomes inactive or a rotor is activated or its drive reversed. Such steps may cause the UAV to manoeuvre in useful ways, for example to hover, to react to obstacles, to react to unexpected airflows, or to perform a tumbling motion.

Figure 5:
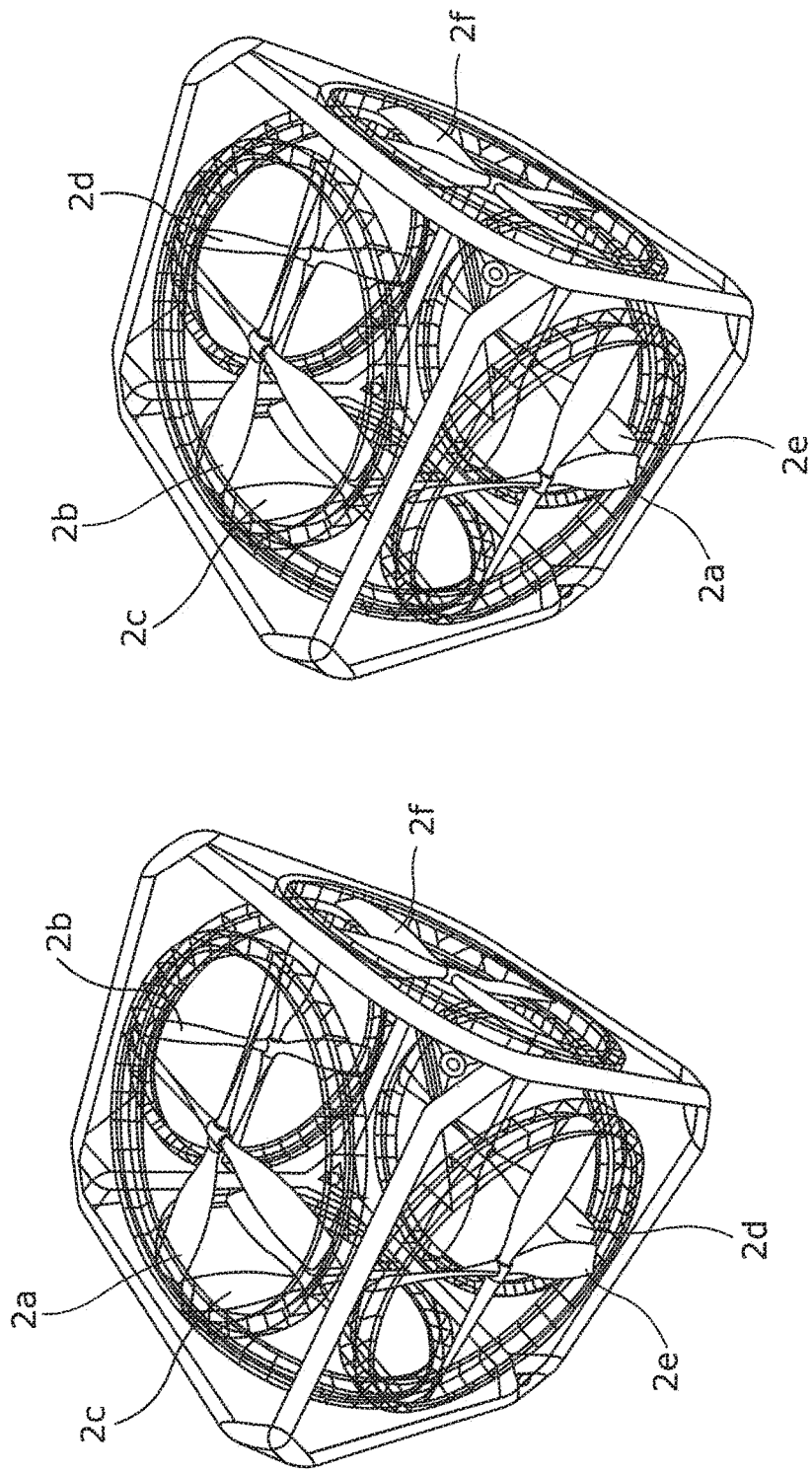
FIG. 5 is a schematic of two front perspective views of a UAV operated according to a method of a fifth embodiment of the invention.

A fifth example embodiment relates to a method of flying a UAV 1, in which the UAV 1 comprises six independently controllable and reversible rotors (2a, 2b, 2c, 2d, 2e and 2f) (FIG. 5). The first set of rotors comprises three rotors (2a, 2b and 2c), and the second set of rotors comprises three rotors (2a, 2e and 2f).

The method according to the fifth example embodiment of the invention comprises a first step of flying the UAV 1 using the first set of three rotors (2a, 2b and 2c) to provide lift. Each of the rotors of the first set of rotors (2a, 2b and 2c) is separately driven by a brushless motor controlled by a MOSFET based controller (not shown). In the first step of the fifth example embodiment of the invention, the three rotors of the first set of rotors (2a, 2b and 2c) are on the uppermost three faces of the UAV 1. In order to provide lift during the first step, each of those three rotors (2a, 2b and 2c) rotates in an anti-clockwise direction when viewing the outermost face of the rotor, that is, the side of the rotor facing out from the body of the UAV 1.

Lift is provided in the first step by the three uppermost rotors (2a, 2b and 2c) drawing air into the body of the UAV 1, the air being drawn in a downward direction.

Following at least partial rotation of the UAV 1, the method of the fifth example embodiment of the invention also comprises a second step, in which the UAV is flown using the second set of three rotors (2a, 2e and 2f) to provide lift. Each of the rotors of the second set of rotors (2a, 2e and 2f) is separately driven by a brushless motor controlled by a MOSFET based controller (not shown). In the second step of the fifth example embodiment of the invention, the three rotors of the second set of rotors (2a, 2e and 2f) are on the lowermost three faces of the UAV 1. In order to provide lift during the second step, each of those three rotors (2a, 2d and 2f) rotates in a clockwise direction when viewing the outermost face of the rotor, that is, the side of the rotor facing out from the body of the UAV 1.

Lift is provided in the second step by the three lowermost rotors (2a, 2e and 2f) expelling air out of the body of the UAV 1 in a downward direction.

It will be observed that one of the uppermost rotors (referenced 2a) used in the first step by being driven in the anti-clockwise direction is subsequently used as one of the lowermost rotors used in the second step by being driven in the clockwise direction.

The skilled reader will see from the foregoing specific description of the method of the fifth example embodiment of the invention that the method may also optionally comprise additional steps in which various sets of three rotors are used in either direction in order to provide lift. Optionally the UAV may be operated in the methods of flight described above so that such that rotors on opposing faces of the cube rotate to encourage air flow through the body of the cube in a particular direction.

As mentioned above in relation to various embodiments of the invention, the UAV of the present invention may be such that it may be operated in a tumbling mode of motion. Such a tumbling motion may have uses in methods where the sensors on the UAV rely on movement of the vehicle to gather data.

Figure 6:
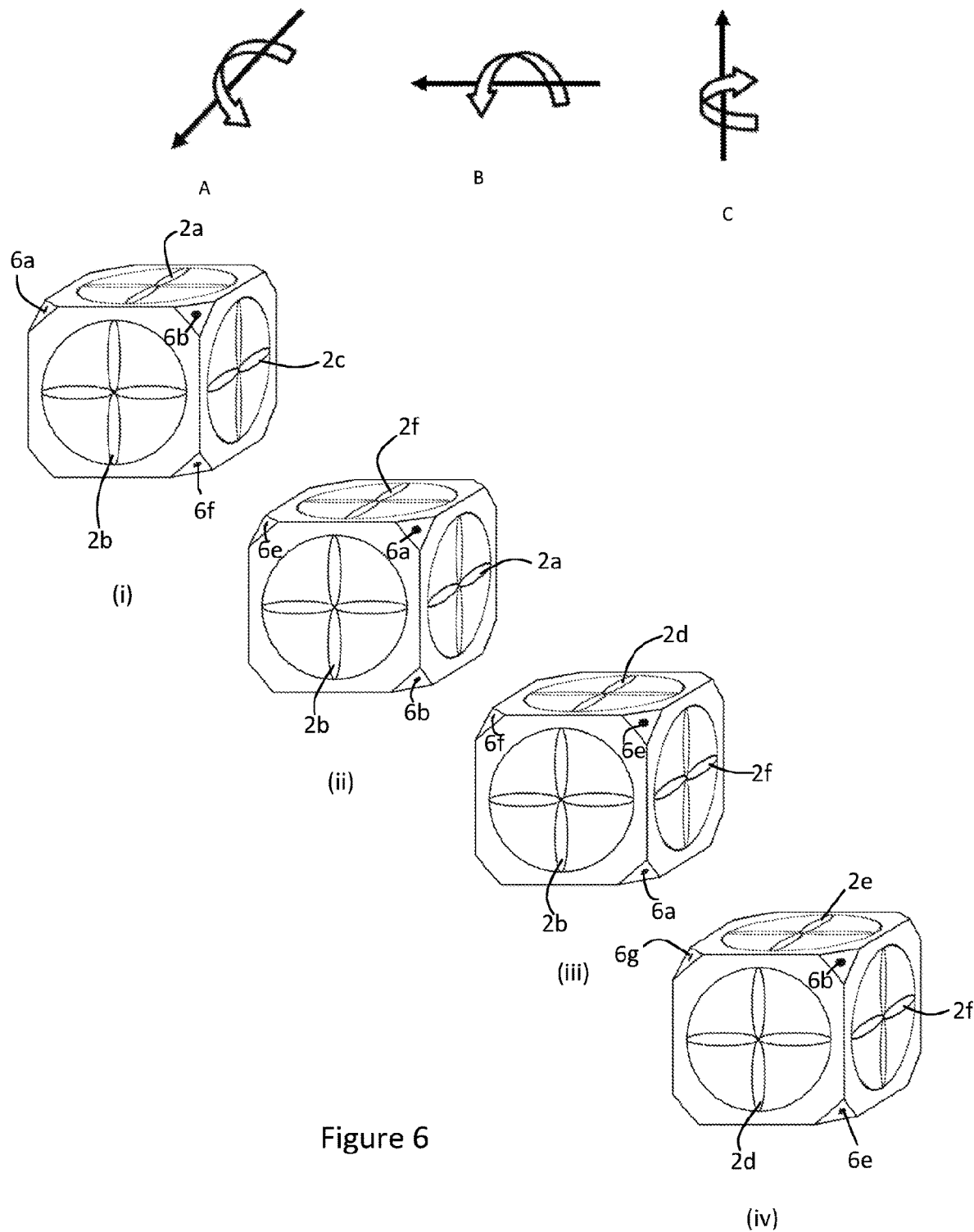
FIG. 6 is a schematic of a front perspective view of a UAV operated according to a method of a sixth embodiment of the invention.

A sixth example embodiment shown in FIG. 6 relates to a method of flying a UAV 1, preferably in the shape of a polyhedron—for example a cube—having chamfered corners in order to capture data from an environment using sensors 6a to 6h (eight in this case, not all shown) mounted on the chamfered corners of the polyhedron (cube). According to the method of the sixth example embodiment, in the first step the UAV 1 is flown so that is assumes a first orientation in space (i), in which orientation the sensors (6a to 6h) capture a first set of data. In the first orientation in space (i), four of the sensors (6a to 6d, not all shown) are on the uppermost four chamfered corners of the UAV 1 and four of the sensors (6e to 6h, not all shown) are on the lowermost four chamfered corners of the UAV. Image data is captured by the sensors in this orientation.

In a second step of the method, the UAV 1 is rotated by 90 degrees about a first horizontal axis (A) to assume a second orientation in space (ii). In the second orientation in space (ii), four of the sensors (6a, 6d, 6e and 6h, not all shown) are on the uppermost four chamfered corners of the UAV 1 and four of the sensors (6b, 6c, 6e and 6f, not all shown) are on the lowermost four chamfered corners of the UAV. Image data is also captured by the sensors in this orientation.

In a third step of the method, the UAV 1 is rotated by a further 90 degrees about the first horizontal axis (A) to assume a third orientation in space (iii). In the third orientation in space (iii), four of the sensors (6e to 6h, not all shown) are on the uppermost four chamfered corners of the UAV 1 and four of the sensors (6a to 6d, not all shown) are on the lowermost four chamfered corners of the UAV. Image data is also captured by the sensors in this orientation.

In a fourth step of the method, the UAV 1 is rotated by 90 degrees about a second horizontal axis (B) to assume a fourth orientation in space (iv). In the fourth orientation in space (iv), four of the sensors (6c, 6d, 6g and 6h, not all shown) are on the uppermost four chamfered corners of the UAV 1 and four of the sensors (6a, 6b, 6e and 6f, not all shown) are on the lowermost four chamfered corners of the UAV. Image data is again captured by the sensors in this orientation.

The skilled reader will see from the foregoing specific description of the embodiments of the invention that the method of this sixth embodiment may also optionally comprise additional steps in which various rotations about horizontal axes take place, not limited to the horizontal axes depicted in FIGS. 6 (A and B), with or without rotation about a substantially vertical axis (such as C). It is envisaged that the rotational steps of the method may optionally be accompanied by one or more translations in any direction. It is also envisaged that rotations about axes may be greater than 90 degree rotations. It will be understood therefore that the rotation may be more complicated than illustrated, and may be rotation about a substantially horizontal axis that itself oscillates in space (with optional translational movement too). A tumbling motion is believed to be particularly beneficial.

The sensors may capture and relay data midway between the orientations shown in FIG. 6. Transmit/receive units could be used as sensors at the vertices. The Tx/Rx units could be similar to those found on phased array and SAR radars that have a reliance on the aircraft motion. By virtue of the UAV having motion, whilst potentially in a hovering mode, such sensors can be readily exploited by means of the methods of the presently described embodiments.

Whilst the present invention has been described and illustrated with reference to particular embodiments, it will be appreciated by those of ordinary skill in the art that the invention lends itself to many different variations not specifically illustrated herein.

It will for example be seen that the embodiments as illustrated by the accompanying drawings have rotors so arranged that the planes of rotation of the rotors define a regular convex polyhedron. Other embodiments are envisaged in which the planes of the rotors define an irregular convex polyhedron. There may be embodiments of the invention in which the UAV has rotors arranged so that the planes of rotation of the rotors do not define a closed shape in 3-D, or define a closed shape which is not a convex polyhedron, but nevertheless allow the UAV to fly in any orientation. It is envisaged that such a UAV would however have an arrangement of rotors, preferably spaced around a centre of the vehicle and preferably having axes that converge together in a region within the body of the vehicle, so that in relation to a vector representing an arbitrary direction (i.e. any single direction) there will always be at least one rotor oriented such that the axis of the rotor is less than 60 degrees, more preferably less than 55 degrees, and possibly less than 45 degrees, from the line extending from the axis in the direction represented by that vector. Thus, in such a case, the UAV will always be positioned such that there will be at least one rotor oriented such that its axis of rotation is oriented less than 60 degrees to the vertical. Such a UAV could have the general shape of a hemi-icosahedron, for example having ten rotors (one per face), or a hemi-dodecahedron having six rotors (one per face).

There may also be embodiments of the invention that utilise the feature of the rotors being arranged at the periphery of the main body the UAV, there being an open space within the body which facilitates the flow of air to or from each of the rotors, without the planes of the rotors necessarily defining a convex polyhedron and possibly without the axes of the rotors being arranged so that there will always be one that is less than 60 degrees to the vertical. Such a UAV could for example have the same general shape as the cube-shaped UAV shown in FIG. 1, but without two of the rotors, those rotors being replaced with some other form of control surface or thrust device.

The methods of operation of the UAV, in which different rotors are used in different combinations, need not necessarily employ a UAV having the features of the illustrated embodiments. It may for example be possible to capture images from a scene using a different configuration/type of UAV but employing a tumbling motion.

Some of the rotors of the UAV of alternative embodiments of the invention need not be fixed-axis rotors.

The structural arrangement of a polyhedron, in particular a regular polyhedron such as the cube lends itself to 3D printing manufacturing techniques (such as additive layer techniques). Other manufacturing techniques could be used instead or in combination with a 3-D printing method.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An unmanned aerial vehicle, wherein
the unmanned aerial vehicle comprises at least four rotors, each rotor having a plane of rotation,
the at least four rotors are arranged such that the plane of rotation of each rotor is co-planar with a face of a notional polyhedron,
each face of the notional polyhedron is co-planar with the plane of rotation of at least one rotor; and
the unmanned aerial vehicle comprises a substantially hollow main body in the form of an exoskeleton structure which provides a supporting structure for the unmanned aerial vehicle, the substantially hollow main body defining an open space at a center of the body which facilitates the flow of air to or from each of the rotors.

2. The unmanned aerial vehicle according to claim 1, wherein the notional polyhedron is a convex polyhedron.

3. The aerial vehicle according to claim 1, wherein the notional polyhedron is a cube.

4. The unmanned aerial vehicle according to claim 1, wherein the area of any one face of the notional polyhedron is not more than 150% of the area of any other face of the notional polyhedron.

5. The unmanned aerial vehicle according to claim 1, wherein for each rotor the diameter of the circular disc-shape that is swept out by the rotor when rotated is not less than 25% of the longest dimension of the face of the notional polyhedron coplanar with the rotor.

6. The unmanned aerial vehicle according to claim 1, where all of the at least four rotors are substantially the same size.

7. The unmanned aerial vehicle according to claim 1, wherein each of the at least four rotors is surrounded by the body in the rotational plane of the rotor.

8. The unmanned aerial vehicle according to claim 1, wherein the exoskeleton structure both provides the supporting structure of the unmanned aerial vehicle and surrounds and protects each of the rotors in the rotational plane of the rotor.

9. The unmanned aerial vehicle according to claim 1, wherein the unmanned aerial vehicle comprises a body having at least four faces, wherein each of the at least four rotors is recessed into one of the at least four faces of the body.

10. The unmanned aerial vehicle according to claim 1, wherein each of the at least four rotors is driven by a circumferential drive.

11. The unmanned aerial vehicle according to claim 1, wherein the volume of the notional polyhedron is less than 200,000 cm$^3$.

12. The unmanned aerial vehicle according to claim 1, wherein the unmanned aerial vehicle comprises at least four sensors, and wherein each sensor is located in the region of a vertex of the notional polyhedron.

13. The unmanned aerial vehicle according to claim 12, wherein at least one sensor is positioned in the region of every vertex of the notional polyhedron.

14. A method of flying an unmanned aerial vehicle in order to capture data from an environment, the unmanned aerial vehicle comprising a plurality of sensors mounted at different locations on the vehicle to capture such data, wherein the method comprises a step of flying the vehicle so that it assumes a first orientation in space at which first data is captured by the sensors, rotating the vehicle by at least +90 degrees about a substantially horizontal axis so as to assume a second different orientation in space at which second data is captured by the sensors wherein
each of the plurality of sensors mounted at different locations is an imaging sensor, the method includes imaging an area using the unmanned aerial vehicle,
the unmanned aerial vehicle comprises at least four rotors, each rotor having a plane of rotation,
the at least four rotors are arranged such that the plane of rotation of each rotor is co-planar with a face of a notional polyhedron,
each face of the notional polyhedron is co-planar with the plane of rotation of at least one rotor,
each imaging sensor is located in the region of a vertex of the notional polyhedron.

15. The method of flying an unmanned aerial vehicle according to claim 14, wherein the method additionally comprises rotating the vehicle by at least +90 degrees about the same or a different substantially horizontal axis so as to assume a third different orientation in space at which third data is captured by the sensors.

16. The unmanned aerial vehicle according to claim 1, wherein the at least four rotors are configured and arranged such that in any orientation of the vehicle there will be at least one rotor positioned such that its axis of rotation is oriented less than 60 degrees to the vertical, and such that the vehicle is arranged to be able to fly in any orientation of the vehicle.

17. The unmanned aerial vehicle according to claim 1, wherein the unmanned aerial vehicle comprises a main body, wherein each of the rotors is arranged at the periphery of the main body, and wherein the main body is so shaped as to define a space within the center of the body which facilitates the flow of air to or from each of the rotors.

18. An unmanned aerial vehicle, wherein
the unmanned aerial vehicle comprises at least four rotors, each rotor having a plane of rotation,
the at least four rotors are arranged such that the plane of rotation of each rotor is co-planar with a face of a notional polyhedron,
each face of the notional polyhedron is co-planar with the plane of rotation of at least one rotor; and
the unmanned aerial vehicle comprises at least four sensors, wherein each sensor is located in the region of a vertex of the notional polyhedron.

* * * * *